US010690948B2

(12) United States Patent
De Jong et al.

(10) Patent No.: US 10,690,948 B2
(45) Date of Patent: Jun. 23, 2020

(54) DEVICE FOR THE REGULATION OF LIGHT TRANSMISSION

(71) Applicant: Merck Patent GmbH, Darmstadt (DE)

(72) Inventors: Ties De Jong, Utrecht (NL); Casper Laurens Van Oosten, Waalre (NL); Felix Fritz Rudolf Schlosser, Eichstaett (DE)

(73) Assignee: Merck Patent GmbH, Darmstadt (DE)

( * ) Notice: Subject to any disclaimer, the term of this patent is extended or adjusted under 35 U.S.C. 154(b) by 156 days.

(21) Appl. No.: 15/544,331

(22) PCT Filed: Dec. 22, 2015

(86) PCT No.: PCT/EP2015/002595
§ 371 (c)(1),
(2) Date: Jul. 18, 2017

(87) PCT Pub. No.: WO2016/116120
PCT Pub. Date: Jul. 28, 2016

(65) Prior Publication Data
US 2018/0011359 A1 Jan. 11, 2018

(30) Foreign Application Priority Data
Jan. 19, 2015 (EP) ..................... 15000129

(51) Int. Cl.
*G02F 1/133* (2006.01)
*G02F 1/1333* (2006.01)
(Continued)

(52) U.S. Cl.
CPC ............ *G02F 1/13306* (2013.01); *B60J 3/04* (2013.01); *E06B 3/6722* (2013.01); *E06B 9/24* (2013.01);
(Continued)

(58) Field of Classification Search
None
See application file for complete search history.

(56) References Cited

U.S. PATENT DOCUMENTS 5,068,606 A    11/1991  Kawate et al.
6,894,758 B1 *  5/2005  Hagiwara ......... G02F 1/133345
                                                    349/151

(Continued)

FOREIGN PATENT DOCUMENTS

CN    104199847 A    12/2014
DE    102011015950 A1  10/2012
(Continued)

OTHER PUBLICATIONS

Search Report for PCT/EP2015/002595 (WO2016116120A1) dated Mar. 18, 2016.
(Continued)

*Primary Examiner* — Phu Vu
(74) *Attorney, Agent, or Firm* — Millen White Zelano and Branigan, PC; Csaba Henter

(57) ABSTRACT

The present application discloses a switchable device, comprising a switching layer and a first conductive layer and a second conductive layer, where the switching layer is positioned between the first and the second conductive layer, and where at least one of the first and the second conductive layers comprises a plurality of isolating sections and a plurality of conductive sections, where the isolating sections and the conductive sections alternate over the area of the conductive layer, and where the switching state of the switchable device is controlled by touch motions.

22 Claims, 10 Drawing Sheets

(51) Int. Cl.
*G02F 1/1334* (2006.01)
*E06B 3/67* (2006.01)
*E06B 9/24* (2006.01)
*B60J 3/04* (2006.01)
*G02F 1/1347* (2006.01)
*G02F 1/155* (2006.01)

(52) U.S. Cl.
CPC ........ *G02F 1/1334* (2013.01); *G02F 1/13338* (2013.01); *E06B 2009/2464* (2013.01); *G02F 1/1347* (2013.01); *G02F 1/155* (2013.01)

(56) References Cited

U.S. PATENT DOCUMENTS

| | | | |
|---|---|---|---|
| 7,940,457 B2 | 5/2011 | Jain | |
| 8,248,546 B2 | 8/2012 | Kumar | |
| 9,778,533 B2 | 10/2017 | Bertolini | |
| 10,049,402 B1* | 8/2018 | Miranda | G06Q 20/1085 |
| 2008/0094551 A1 | 4/2008 | Hayashi | |
| 2009/0058126 A1 | 3/2009 | Broude | |
| 2009/0290078 A1* | 11/2009 | Yang | G02F 1/13718 |
| | | | 349/16 |
| 2009/0296188 A1* | 12/2009 | Jain | E06B 9/24 |
| | | | 359/245 |
| 2010/0225866 A1* | 9/2010 | Sakamaki | G02F 1/1345 |
| | | | 349/139 |
| 2012/0320298 A1 | 12/2012 | Suzuki et al. | |
| 2013/0300705 A1 | 11/2013 | Goo | |
| 2015/0097389 A1* | 4/2015 | Dryselius | B60J 3/04 |
| | | | 296/96.19 |
| 2016/0262467 A1* | 9/2016 | Magnusson | A41D 13/1184 |

FOREIGN PATENT DOCUMENTS

| | | |
|---|---|---|
| DE | 102013001334 A1 | 7/2014 |
| EP | 2857239 A1 | 4/2015 |
| FR | 2970679 A1 | 7/2012 |
| JP | 3188376 A | 8/1991 |
| JP | 6159914 A2 | 6/1994 |
| JP | 5273725 A | 9/1994 |
| JP | 8184273 A2 | 7/1996 |
| JP | 8313937 A2 | 11/1996 |
| JP | 2000280896 A2 | 10/2000 |
| JP | 2013521521 A | 6/2013 |
| JP | 3188376 U | 1/2014 |
| WO | 07136063 A1 | 11/2007 |
| WO | 2009146371 A1 | 12/2009 |
| WO | 14121809 A1 | 8/2014 |

OTHER PUBLICATIONS

English machine translation of DE102013001334A1 published Jul. 31, 2014 to Kuehne Marcus of Audi AG.
English machine translation of DE102011015950A1 published Oct. 4, 2012 to Desjean Aline Dipl.-lng. of Daimler AG.
English machine translation of FR2970679A1 published Jul. 27, 2012 to Blandeau Jerome of Peugeot Citroen Automobiles SA.
Search report in corresponding Japanese Patent Application No. 2017-537917 dated Nov. 7, 2019 (pp. 1-16).

* cited by examiner a)

b)

c)

a)

b)

c)

DEVICE FOR THE REGULATION OF LIGHT TRANSMISSION

The present application concerns a switchable device for the regulation of light transmission, which has a segmented structure, where the switching state of the segments of the segmented structure is controlled by touch motions.

Light is understood to be, in the sense of the present application, electromagnetic radiation in the range of 320 nm to 2000 nm, i.e. comprising NIR-, VIS- and UV-A-light. Preferably, the light which is regulated by the switchable device is understood to be light in the visible (VIS) range of the electromagnetic spectrum.

Voltage is understood to be, in the sense of the present application, any electrical signal that is characterized by a certain RMS (root-mean-square) value, a certain amplitude, a certain frequency and/or a certain waveform. It is thus not to be understood only in its narrow literal meaning.

Switchable devices for the regulation of light transmission are understood to be devices having at least two states, where in one of these states (the dark state or scattering state), they allow only a small proportion of the incident light to pass through at all, or they allow only a small proportion of the incident light to pass through unscattered, while in another of these states (the clear state), they allow a large proportion of the incident light to pass through. Due to this function, they have attracted considerable interest, in particular for use in architecture or automotive applications, to improve the indoor climate and light conditions. Typically, these devices are switched from one state to the other by application of a voltage across a switching layer which comprises a functional material.

Different technical solutions have been proposed and are commercially used for this purpose, among them liquid crystal based switchable devices, electrochromic switchable devices and suspended particle based switchable devices. Among the liquid crystal based switchable devices, the ones based on dye doped small molecule liquid crystals, and the ones based on polymer dispersed liquid crystals are of currently high technical relevance. A review of the different technical solutions is given, for example, in R. Baetens et al., Solar Energy Materials & Solar Cells, 2010, 87-105.

Compared to conventional windows, windows comprising the above-mentioned switchable devices allow for new designs and usages of facades. The user can determine the degree of light transmission through the window at will via an interface. Due to ambient lighting conditions, it is often desirable to switch only a specific part of the window. Also, depending on the angle in which the sun shines through the window, it is in many cases desirable to only switch e.g. the upper part of the window to the dark state, and let the lower part of the window remain in the clear state.

Windows having a large number of switchable segments are currently not available commercially. Consequently, no straightforward solution for their control has been proposed in the prior art so far.

In view of this state of the art, the present invention proposes a switchable device for the regulation of energy transfer which can be easily and intuitively operated, and which is capable of selective switching of its segments over its whole area.

The invention has the benefit that the obtained devices can easily be made outdoor stable and robust by addition of sealings and frames, that they are easy to make stable against UV light, and that they have a large scope of adjustable transmission from dark to clear state. Furthermore, they can be manufactured in a cost effective manner, due to their simple setup.

The invention therefore relates to a switchable device for the regulation of light transmission, comprising a stack of layers which comprises a first substrate layer, a second substrate layer, a switching layer which is positioned between the first and the second substrate layer, a first conductive layer which is positioned between the switching layer and the first substrate layer, and a second conductive layer which is positioned between the switching layer and the second substrate layer, where the switching layer comprises a material which changes its light transmissivity upon the application of voltage, and where at least one of the first and the second conductive layers comprises a plurality of isolating sections and a plurality of conductive sections, where the isolating sections and the conductive sections alternate over the area of the conductive layer, and where the switching state of the switchable device is controlled by touch motions.

The following figures serve to illustrate the invention:

FIG. 1 shows the stack of layers of a switchable device according to the present application, which comprises a first substrate layer (1) and a second substrate layer (5), a first conductive layer (2) and a second conductive layer (4), and a switching layer (3).

FIG. 2 shows the stack of layers of a switchable device according to the present application, being part of an insulated glass unit (IGU), having in addition to the layers of FIG. 1 a solid layer (9), preferably from glass, a touch sensitive layer (10) which is optional component of the stack of layers, and a gas filled space (8a) which is enclosed by spacers (8b).

FIG. 3 shows the stack of layers of a switchable device according to the present application, being part of an IGU, having in addition to the layer setup of FIG. 1, which is present twice in the stack of layers, with the two moieties being connected by a gas filled space (8a) enclosed by spacers (8b), a solid layer (9), preferably from glass, a touch sensitive layer (10) which is optional component of the stack of layers, and a gas filled space (8a) which is enclosed by spacers (8b). It is noted that at least one of the two layers consisting of parts (8a) and (8b) may be omitted. In this case, also substrate layers (1) or (5) and solid layers (9) may be omitted, where appropriate, to simplify the structure.

FIG. 4 shows by means of example a front view of the first conductive layer (2) of the switchable device, having a plurality of isolating sections (7) in the form of parallel spaced lines, and a plurality of conductive sections (6), where the isolating sections and the conductive sections alternate.

FIG. 5 shows a first conductive layer (2) and a second conductive layer (4) stacked on top of each other, where the second conductive layer (4) is, from the perspective of the observer of the figure, on top of the first conductive layer (2), where the two conductive layers (2) and (4) are not completely overlapping, but leave a relatively smaller part (2a) of the first conductive layer not covered by the second conductive layer (4), while a relatively larger part (2b) of the first conductive layer is covered by the second conductive layer (4). As in FIG. 4, a plurality of conductive sections (6) and a plurality of isolating sections (7) is present in the first conductive layer (2), where the parts of the conductive sections of the first conductive layer which do not overlap with the second conductive layer are denoted with reference number (6a), and the parts of the conductive sections of the first conductive layer which overlap with the second conductive layer are denoted with reference number (6b). The switching layer (3) which is present in between the conductive layers (2) and (4) is not shown in FIG. 5 for reasons of clarity.

FIG. 6 shows the stack of layers of FIG. 1, with the additional feature that the conductive layer (2) is not completely aligned with the other layers in the stack, leaving a part (2a) of the first conductive layer which is not covered by the second conductive layer (4) and the switching layer (3) and is thus freely accessible from at least one side. The figure shows the same situation as is depicted in FIG. 5, only seen from the side of the device instead of from the top of the device.

FIG. 7 shows an assembly of electrical components connected to the switchable device according to the present application, comprising a touch sensitive device (11), an optional computer (12), a programmable logic controller (13), comprising a digital output (13b) and an analog output (13a), a voltage source with preferably variable voltage (14), ground level (15), a device comprising a plurality of switches (16), and connections of the switches to the conductive sections of the conductive layer of the switchable device (17).

FIG. 7a shows an alternative assembly of electrical components connected to the switchable device according to the present application, comprising a touch sensitive device (11), an optional computer (12), a programmable logic controller (13), comprising a digital output (13b) and an analog output (13a), an AC voltage source (14), preferably containing an electrical H-bridge, with preferably variable voltage, a common voltage (15a), a signal voltage (15b), a device comprising a plurality of switches (16), connections of the switches to the conductive sections of the conductive layer of the switchable device (17) that can be connected to the common or to the signal output and a connection to the common output (18) that is connected to the substrate containing no isolating sections.

FIG. 8 shows the result of touch gestures to the switchable device, as defined by the software. (A) is a single tap on a segment (segments being illustrated by the dashed lines) and results in the switching of the respective segment from on to off or from off to on. (B) is a vertical drag motion in a region on the right side of the window, which results in switching the segments consecutively. A drag down motion switches the segments consecutively to a dark state, starting from the top segment and continuing until the drag motion stops. A drag up motion switches the segments consecutively to a bright state, starting from the bottom segment and continuing until the drag motion stops. (C) is a horizontal drag motion in a region at the bottom of the window, where a drag to the left results in dimming of segments that are switched on and a drag to the right increases the transmissivity of segments that are switched on. (D) is a double tap in a region in the bottom right, which results in switching all segments to the dark state or all segments to the bright state.

A conductive layer is, for the purposes of the present application, understood to be a layer which conducts electricity in a sufficient manner to enable an electrical field to be created between the two major faces of the switchable layer, if the switchable layer is positioned between two conductive layers, one on each of the major faces of the switchable layer, when a voltage source having a low voltage is connected to it and to a second conductive layer positioned on the opposite side of the switching layer.

An analogous definition applies to the term "conductive section". To the contrary, isolating sections are understood to be sections which are not capable of conducting electricity to a relevant extent. In particular, they serve the purpose of isolating the conductive sections in the conductive layer from each other, by forming boundaries to electrical conduction. According to a preferred embodiment, the resistance between two conductive sections, which are delimited against each other by an isolating section is more than 1 M$\Omega$, preferably more than 10 M$\Omega$, particularly preferably more than 50 M$\Omega$.

A straightforward means to create isolating sections in a conductive layer is to remove the conductive material in these positions. The skilled person is aware of methods suitable for this, in particular on a microscopic level, for example laser ablation, chemical etching, laser photolithography, mechanical embossing techniques, and photo embossing. A preferred approach is laser ablation using an excimer laser.

An alternative solution would be to sputter an ITO (indium tin oxide) or similar conductive material coating as a conductive layer while certain sections are covered, and later on remove the covering material to obtain a glass section without the coating. The methods mentioned in the above paragraph may be used for this approach. Again an alternative method would be to coat conductive material only in specific sections by inkjet printing of solution processable conductors, thereby eliminating the need to create the isolating sections at all.

The conductive layer can be made from a thin layer of metal, preferably silver, or of other material, where the other material is preferably selected from metal oxide, more preferably from transparent conductive metal oxide (TCO), particularly preferably from indium tin oxide (ITO), fluorinated tin oxide (FTO), and aluminium doped tin oxide (AZO), or from silver nanowires, carbon nanotubes, graphene, conductive polymers, in particular PEDOT:PSS, a metal mesh, or silver nanoparticles.

It is furthermore preferred that the first and the second conductive layer are rectangular. Under certain circumstances, in particular when the windows are used in vehicles, such as e.g. cars, it is preferred that the windows have a non-rectangular form.

It is furthermore preferred that only one of the first and the second conductive layers comprises a plurality of isolating sections, and the other one of the first and the second conductive layers comprises no or essentially no isolating sections.

It is preferred according to the present invention that the isolating sections and the conductive sections of the conductive layer alternate in a regular pattern over the area of the conductive layer. Such pattern is, according to a preferred embodiment, represented by a pattern of lines which are regularly spaced and parallel to each other, preferably also parallel to the edges of the conductive layer, where the conductive layer is preferably rectangular. In this case, the lines represent the isolating sections, and the space between the lines represent the conductive sections. Preferably, the distance between the parallel and regularly spaced lines is in each case between 1 $\mu$m and 1 m, preferably between 1 cm and 50 cm, particularly preferably between 1 cm and 10 cm. A representative example of such conducting layer having a regular pattern of isolating sections and conductive sections is shown in FIG. 4.

According to a preferred embodiment, the isolating sections are lines with a width of 0.2 $\mu$m to 100 $\mu$m, preferably 1 $\mu$m to 75 $\mu$m, particularly preferably 10 $\mu$m to 50 $\mu$m.

It is preferred that at least one of the first and the second conductive layers has a plurality of parallel lines where the conductive material is not present or inactivated, where the parallel lines represent the isolating sections, and the remaining parts of the layer represent the conductive sections. Preferably, the lines are in this case regularly spaced and parallel to each other.

It is preferred that within the conductive layer, the conductive sections are isolated from each other, by means of the isolating sections. Preferred electrical resistances between two adjacent conductive sections, which are isolated from each other by means of an isolating section, are as disclosed above. This enables a separate electrical contacting and addressing of each of the separate conductive sections. For each one of the plurality of conductive sections, it is preferred that a power source can be applied to each of the conductive sections of the respective conductive layer independently. This is preferably achieved by means selected from direct addressing, passive matrix addressing, active matrix addressing and multiplex driving.

For each of the plurality of conductive sections to be contacted electrically separately, the following structuring of the stack of layers of the switchable device is preferred:

A part of one of the first and the second conductive layers does not overlap in the stack with the other of the first and the second conductive layers, preferably is freely accessible from at least one side, and this part is electrically connected to voltage, preferably to an electrical switch or to an electrical signal controlling the transmissivity of the switchable layer. Preferably, this part is on the side margin of the conductive layer.

Further, it is preferred that the part of one of the first and the second conductive layers which does not overlap in the stack with the other of the first and the second conductive layers has overlapping areas with each of the conductive sections of the conductive layer, where preferably, in these overlapping areas, the conductive sections are each separately electrically connected to voltage, preferably to an electrical switch or to an electrical signal controlling the transmissivity of the switchable layer. This particular arrangement of the first and the second conductive layer is shown in FIG. 5 in a front view, and in FIG. 6 in a side view on the layers.

It is preferred that the conductive layer which does not have conductive sections and isolating sections is set to zero voltage, i.e. is the common ground, while the conductive layer which has conductive sections and isolating sections is connected to voltage.

Such method of operation is schematically shown in FIG. 9, where part a) shows the voltage set at ground, part b) shows the voltage applied to the segmented substrate, when "on" (signal voltage), and part c) shows the voltage applied to the segmented substrate, when "off". In FIG. 9, in the graphs, the time is on the x-axis, and the voltage is on the y-axis.

In another preferred embodiment, the conductive layer which does not have conductive sections and isolating sections is set to a common voltage, while the conductive layer which has conductive sections and isolating sections is connected to the common voltage when it is switched off and to a signal voltage when it is switched on.

Such method of operation is schematically shown in FIG. 10, where part a) shows the common voltage applied to the non-segmented substrate, part b) shows the voltage applied to the segmented substrate (signal voltage), when "on", and part c) shows the common voltage, which is applied to the segmented substrate, when "off". In FIG. 10, in the graphs, the time is on the x-axis, and the voltage is on the y-axis.

It is preferred that the parts of each of the conductive sections of one of the first and the second conductive layers which do not overlap in the stack with the other of the first and the second conductive layers have a width of 1 to 10 mm, preferably 2 to 8 mm. In a preferred embodiment, this is achieved by leaving a margin of the conductive layer having a plurality of conductive sections and a plurality of isolating sections which does not overlap with the adjacent layers of the stack of layer. Preferably, this margin has a width of 1 to 10 mm, preferably 2 to 8 mm. Following this procedure, on the margin, the conductive sections are accessible from one side.

The above-mentioned non-overlapping parts can be achieved by misalignment of two equally sized conductive layers, preferably by a distance of 1 to 10 mm, particularly preferably 2 to 8 mm. This is shown in FIG. 5 in a front view, and in FIG. 6 in a side view on the layers. In the alternative, one conductive layer can be chosen to be different in size from the other conductive layer, leaving the above-mentioned non-overlapping parts. Further, in the alternative, the non-overlapping parts may be obtained by cutting out one or more pieces from the conductive layer which does not have conductive sections and isolating sections.

According to a preferred embodiment of the present invention, for each one of the plurality of conductive sections, the switching state of the specific section of the switching layer which is covered by the area of the conductive section can be selected independently of the switching state of the other sections of the switching layer. Preferably, the switching state of each of the specific sections of the switching layer which can be selected independently is controlled by touch motions on a touch sensitive layer, where the touch motions are preferably selected from tap gestures, double tap gestures and drag gestures.

It is preferred that in the stack of layers of the switchable device, the first conductive layer is directly adjacent to the first substrate layer, and the second conductive layer is directly adjacent to the second substrate layer. It is particularly preferred that the first conductive layer and the first substrate layer are formed by a first sheet of glass or polymer coated with a layer of metal or other material, as disclosed above for the conductive layer, and the second conductive layer and the second substrate layer are formed by a second sheet of glass or polymer coated with a layer of metal or other material, as disclosed above for the conductive layer.

According to another preferred embodiment, the first conductive layer is not directly adjacent to the first substrate layer, and the second conductive layer is not directly adjacent to the second substrate layer, but a barrier layer which is preferably a barrier layer against ion migration, particularly preferably a layer of $SiO_2$, is present between the respective substrate layer and the respective conductive layer.

Further, $SiO_2$ layers may be present between the conductive layer and the alignment layer or the switching layer.

It is furthermore preferred that the stack of layers comprises at least one, preferably two alignment layers, which are positioned between the switching layer and the conductive layer, in direct contact with the switching layer. The alignment of the liquid crystal that results from the alignment layer should be in correspondence with the desired mode of the switchable device (i.e. the required twist angle). For a twisted nematic mode, for example, the first alignment layer should be arranged to be perpendicular to the second alignment layer. In a double cell layout, e.g., the first alignment layer of the second cell should be arranged to be perpendicular to the second alignment layer of the first cell.

The stack of layers of the device according to the present invention preferably comprises the following layers in the following sequence:
first substrate layer
first conductive layer
first alignment layer
switchable layer
second alignment layer
second conductive layer
second substrate layer.

According to one embodiment which is preferable in certain circumstances, the stack of layers of the switchable device comprises a polarizing layer, which is preferably positioned between one of the substrate layers and the switching layer, or on the outside of the substrate layer, on the face of the substrate layer which points away from the switching layer. Particularly preferably, the polarizing layer is positioned on the outside of the substrate layer, on the face of the substrate layer which points away from the switching layer. According to a further embodiment which is preferable in certain circumstances, the stack of layers of the switchable device comprises two polarizing layers, one of which is positioned on one side of the switching layer, and the other on the opposite side of the switching layer. The polarizing layers are selected from absorptive and reflective polarizing layers. The polarizing layers should be polarizing in the visible part of the spectrum. When used in outside facing windows, they should be light (or UV) stable. The transmission value for one polarization direction should preferably be less than 10%. The transmission value for the other polarization direction should preferably be more than 90%. The orientation of the polarizing layer should be perpendicular to the orientation of the adjacent liquid crystal alignment layer.

It is furthermore preferred that the stack of layers comprises a UV blocking layer, which blocks transmission of light with wavelengths in the range of 350 nm to 390 nm. Preferably, the UV blocking layer has a transmittance in the range of 350 nm to 390 nm of not more than 95%.

Further, in particular circumstances, it is preferred that at least one of the first and the second substrate is attached to a layer of solid material, preferably from glass or polymer. The attachment is preferably by means of lamination or gluing. Such embodiment is particularly preferable in applications of the device in windows of vehicles, such as cars.

Furthermore, it is preferable that a touch sensitive layer is present inside or on the stack of layers of the switchable device. The touch sensitive layer is preferably positioned on an outside surface of the device, for example on the outer face of the substrate layer, or on the outside face of another layer which is positioned on top of the substrate layer, pointing away from the switchable layer. According to another preferred embodiment, the touch sensitive layer is positioned on the interior face of one of the two layers which enclose a gas-filled space in an insulated glass unit comprising the switchable device, or on the interior face of one of the two layers which enclose a gas-filled space in a double cell setup, as shown in the working examples and in FIG. 3. In an alternative preferred embodiment, the touch sensitive layer is present in an external touch sensitive device which is connected to the switchable device by electrical wiring or by wireless connection, such as by WiFi, bluetooth or IR transmitter.

The touch sensitive layer is preferably selected from capacitive touch sensitive layers, resistive touch sensitive layers, acoustic wave touch sensitive layers, capacitive surface-capacitive touch sensitive layers, projected capacitive touch sensitive layers, mutual capacitance touch sensitive layers, self-capacitance touch sensitive layers, infra-red grid touch sensitive layers, infrared acrylic projection touch sensitive layers, optical imaging touch sensitive layers, dispersive signal technology touch sensitive layers, and acoustic pulse recognition touch sensitive layers. Particularly preferably, it is selected from capacitive touch sensitive layers and resistive touch sensitive layers.

According to a preferred embodiment, the switchable device comprises an interconnected assembly, comprising a touch sensitive layer, an assembly comprising one or more logic units, preferably a programmable logic controller (PLC) or a computer, which translates the output signals of the touch sensitive layer into output signals, one or more voltage sources whose output voltage can be varied depending on an input signal, and a plurality of switches which are capable of switching each one of the plurality of conductive segments on and off, depending on an input signal.

The switch switches between a signal/voltage (when the segments of the switchable device should be on) and a position where the respective segment of the switchable device is off (off signal or no signal at all). The PLC drives the various switches: each switch is, in this example, a relay. It is on one position when it receives a voltage from the PLC, and in another position when it receives no voltage from the PLC. The PLC is programmed to the required signal that sets the relay in the desired position. Other switch types may be used according to the invention as well, e.g. MOSFETs. It is preferred to have a computer in between the touch sensitive device and the PLC, if different operating systems are used by both devices. If the touch sensitive device and the PLC are capable of communicating directly with each other, it is preferred that no computer is used.

According to a further preferred embodiment, the switchable device is characterized in that the touch sensitive layer is connected to a computer, which runs a software which translates the output signals of the touchscreen into modified signals, which are further transferred to a programmable logic controller, which controls the switching state of a plurality of switches with digital output signals and which controls the voltage provided by one or more voltage sources with analog output signals, where the one or more voltage sources are connected to the plurality of switches, where the switches, depending on their switching state, apply voltage to the conductive sections of the conductive layer of the switchable device, thereby determining the transmissivity of the corresponding parts of the switchable layer.

According to a further preferred embodiment, the switchable device is characterized in that the touch sensitive layer is connected to a programmable logic controller, which runs a software which translates the output signals of the touchscreen into modified signals, and which thereby controls the switching state of a plurality of switches with digital output signals and which controls the voltage provided by one or more voltage sources with analog output signals, where the one or more voltage sources are connected to the plurality of switches, where the switches, depending on their switching state, apply voltage to the conductive sections of the conductive layer of the switchable device, thereby determining the transmissivity of the corresponding parts of the switchable layer.

According to one preferred embodiment, each of the switches of the plurality of switches is connected to a separate power source with independently adjustable voltage. This enables each of the segments of the switchable device to be switched independently to a different degree of transmission.

It is preferred, in particular in order to obtain a higher contrast of switching, that the switchable device comprises a stack, comprising a first switchable device, as described above, and a second switchable device, as described above. Optionally, the first and second switchable devices are separated by a gas-filled space and spacers are positioned between the first and the second switchable device. Such double cell device is depicted schematically in FIG. 3. Alternatively, the first and second switchable device are directly attached to each other using a laminate or optically clear adhesive. In another embodiment, the first and the second switchable device share one substrate layer, which serves both as a bottom substrate layer of the top switchable device, and as the top substrate layer of the bottom switchable device.

In the case of a double cell device, the stack of layers preferably comprises the following layers in the following sequence:
  first substrate layer
  first conductive layer
  first alignment layer
  switchable layer
  second alignment layer
  second conductive layer
  second substrate layer
  gas filled space and spacers enclosing it, or a lamination layer
  first substrate layer (repeated)
  first conductive layer (repeated)
  first alignment layer (repeated)
  switchable layer (repeated)
  second alignment layer (repeated)
  second conductive layer (repeated)
  second substrate layer (repeated).

As a modification of this stack of layers, the gas filled space and the spacers enclosing it or the lamination layer, as well as one layer selected from the second substrate layer and the first substrate layer (repeated) can be omitted.

In the case of the double cell device, it is preferred that the pattern of the isolating sections and the conductive sections of the conductive layer of the second switchable device corresponds exactly to the pattern of the isolating sections and the conductive sections of the conductive layer of the first switchable device.

Further, in case of the double LC cell setup described above, it is preferred that it comprises a stack, comprising a first switchable device and a second switchable device, where the orientation of the alignment layer of the first switchable device on the substrate adjacent to the second switchable device, and the orientation of the alignment layer in the second switchable device adjacent to the first switchable device, are perpendicular to each other.

Preferably, the switching layer in the switchable device is switched by application of an electric field between at least two different switching states, where one of the states is a dark or scattering state, and the other state is a clear state. According to an embodiment which is preferred under certain circumstances, at least one of the switching states of the device is a state in which the switching layer scatters light. According to an alternative preferred embodiment, none of the switching states of the device are scattering light. A dark state of the device is understood to be a non-scattering state where a relatively low proportion of light is transmitted through the device. A clear state of the device is understood to be a non-scattering state where a relatively high proportion of light is transmitted through the device. A scattering state of the device is understood to be a state in which the device is not transparent, due to the fact that light which is passing through the device is scattered, meaning that rays of light which are parallel before entering the device, are deflected and thus become non-parallel by passing through the device.

The switching layer in the switchable device is preferably selected from electrochromic switching layers, suspended particle switching layers, electrophoretic switching layers and liquid crystal switching layers.

The liquid crystal switching layers are preferably selected from polymer comprising liquid crystal switching layers and from small molecule based liquid crystal switching layers, preferably from small molecule based liquid crystal switching layers. According to another preferred embodiment, they based on a combination of polymer comprising liquid crystals and small molecule liquid crystals.

Further, it is preferred that the liquid crystal switching layer comprises at least one dichroic dye.

Preferable dichroic dyes to be used in the switching layer according to the present invention are benzothiadiazole dyes, such as disclosed in WO 2014/187529, diketopyrrolopyrrole dyes, such as disclosed in WO 2015/090497, thienothiadiazole dyes, rylene dyes, azo dyes, anthraquinone dyes, pyrromethene dyes and malononitrile dyes.

According to one embodiment which is preferable under certain circumstances, the liquid crystal switching layers are selected from polymer comprising liquid crystal switching layers, preferably from polymer dispersed liquid crystal (PDLC) switching layers.

Preferably, the liquid crystal switching layer comprises one or more dichroic dyes dissolved in a liquid crystalline material, where the liquid crystalline material preferably comprises one or more liquid crystalline organic compounds, which are selected from small molecules and polymeric materials, preferably from small molecules.

Preferred liquid crystal materials to be used in the switching layer according to the present invention are disclosed in the following applications: WO 2014/090367, WO 2015/090506, and yet unpublished EP 14001335.0.

Preferably, the liquid crystalline material is in at least one of the switching states in a nematic liquid crystalline state, more preferably in all of the switching states.

Preferably, in the dark state, the liquid crystalline material is in a homogeneous state, whereas in the clear state, the liquid crystalline material is in a homeotropic state. In this case, the homeotropic state is achieved by application of an electrical field to the switchable layer. Other modes of function of the liquid crystal switching layers are however possible, and selected by the skilled person based on his knowledge in the field of liquid crystal based switching devices.

It is furthermore preferred that in the dark state, the liquid crystalline material is in a state selected from nematic non-twisted, nematic twisted and nematic supertwisted, whereas in the clear state, the material is in a homeotropic state.

The invention furthermore relates to a window, comprising a switchable device as described above, preferably characterized in that it comprises an insulated glass unit, where the switchable device is positioned inside of the insulated glass unit. According to a preferred embodiment, the window comprising the switchable device is characterized in that it comprises a separate touch sensitive device, which is preferably positioned on a frame of the window.

The touch sensitive device preferably serves as an interface to control the transparency of the window or of one or more of its segments.

The invention furthermore relates to the use of a switchable device according to the present application or of a window according to the present application in a building or in a vehicle. Vehicles are meant to include, among others and particularly, cars, buses, vessels, trains, streetcars, and airplanes. The term building is meant to include containers or mobile or temporary buildings.

Figure 1:
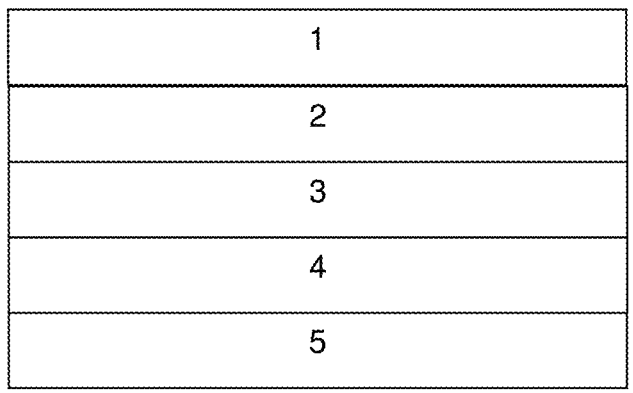
FIG. 1 shows a side view of a the stack of layers of a switchable device according to the present application.
Figure 2:
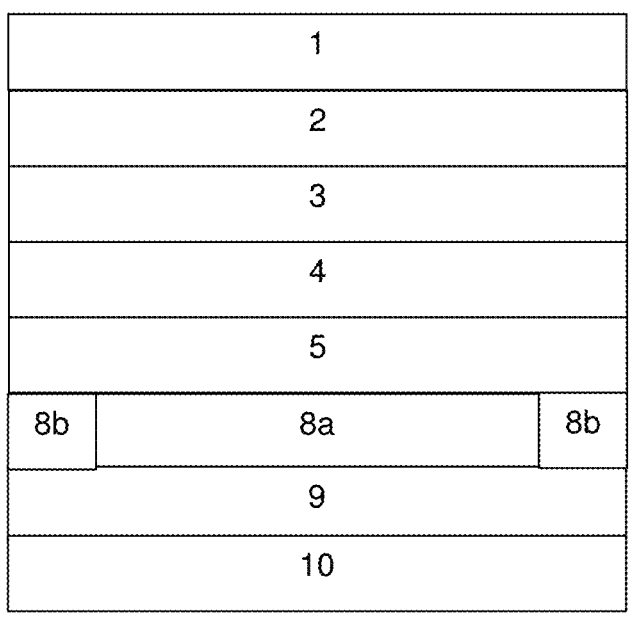
FIG. 2 shows a side view of a the stack of layers of a switchable device according to the present application, being part of an IGU.

LISTING OF REFERENCE NUMBERS 1 first substrate layer
2 first conductive layer
2a the part of the first conductive layer which does not overlap in the stack with the second conductive layer
2b the part of the first conductive layer which overlaps in the stack with the second conductive layer
3 switching layer
4 second conductive layer
5 second substrate layer
6 conductive sections of the first conductive layer
6a the parts of the conductive sections of the first conductive layer which do not overlap with the second conductive layer
6b the parts of the conductive sections of the first conductive layer which overlap with the second conductive layer
7 isolating sections of a conductive layer
8a gas-filled space
8b spacer
9 solid layer, preferably glass layer
10 touch sensitive layer
11 touch sensitive device
12 computer
13 programmable logic controller (PLC)
13a analog output of the PLC
13b digital output of the PLC
14 AC voltage source
15 GND
15a common voltage
15b signal voltage
16 switching device, comprising a plurality of switches
17 connections of the switches to the conductive sections of the conductive layer of the switchable device
18 common output
A single tap gesture on a segment
B vertical drag gesture on the right of the window
C horizontal drag gesture on the bottom of the window
D double tap gesture in a region at the bottom right of the window The following working examples serve to illustrate the present invention. They are not to be construed as limiting the invention in any way beyond the limitations as set out in the claims.

WORKING EXAMPLES

1) Preparation of a Switchable Window Having a Segmented Structure

Figure 4:
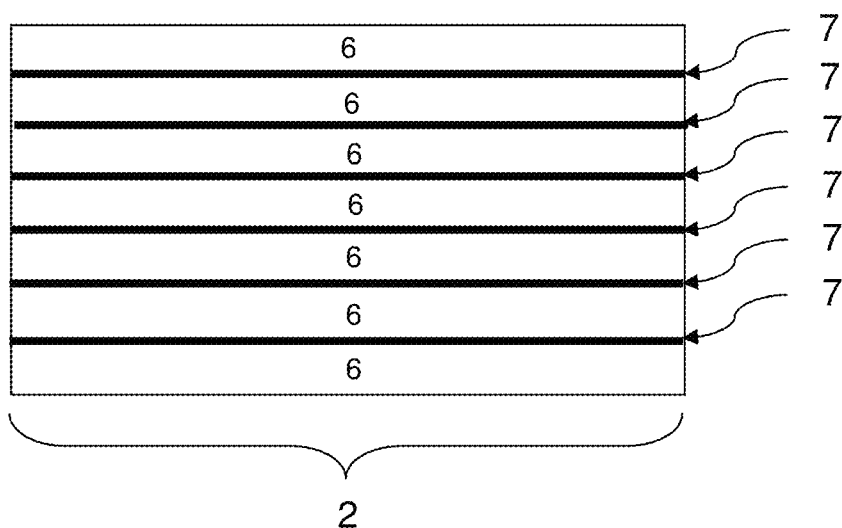
FIG. 4 shows a front view of a conductive layer according to the present application, which has a plurality of conductive sections, and a plurality of isolating sections.
Figure 5:
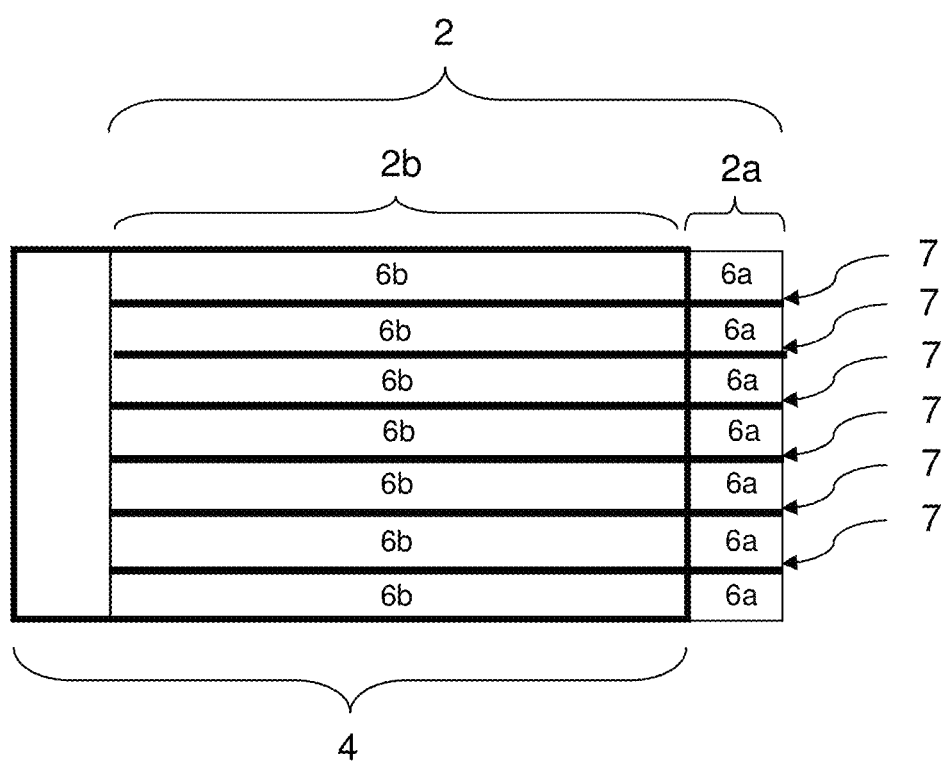
FIG. 5 shows a front view of a first conductive layer and a second conductive layer stacked on top of each other, where the two conductive layers do not fully overlap.

Four sheets of conductive ITO coated glass (80 nm thickness of ITO layer) are obtained commercially. To obtain segmented panels, on two of these sheets, electrically isolated sections are created by laser ablation of the ITO coating. For this, an excimer laser is used with an intensity of 300 mJ/cm$^2$ and >40 pulses per position. The intensity of the laser is adapted to the thickness of the ITO layer. The segments are created in a pattern of regularly spaced lines as shown in FIG. 4. To avoid visibility of the laser lines in the final product, the line width is chosen to be 25 μm. The other two sheets of conductive ITO coated glass are not treated by laser ablation.

Figure 6:
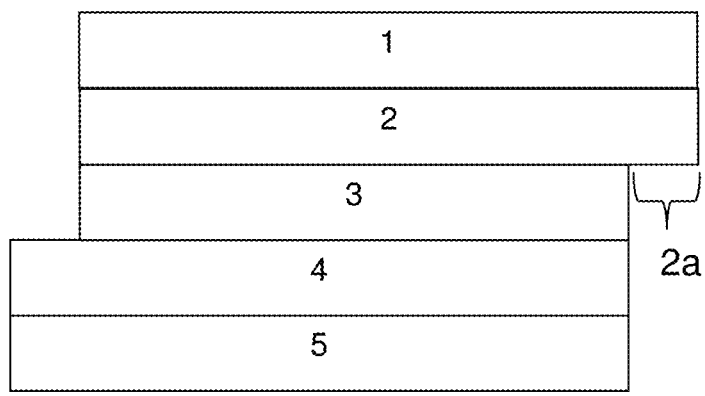
FIG. 6 shows a side view of a the stack of layers of a switchable device according to the present application, where the two conductive layers do not fully overlap.

After washing all four sheets, polyimide is printed on their ITO coating. The substrates are then baked in an oven and the polyimide is rubbed to obtain alignment layers. Subsequently, the four substrates are arranged as two liquid crystal (LC) cells, with alignment layers facing inside, each consisting of both a segmented and a non-segmented sheet. A small non-overlapping area of the sheets is created on the side, having a width of 3-5 mm, which allows to contact all segments (see FIG. 6, simplified scheme for a single LC cell, not showing the alignment layers). The cells are filled with a dye doped liquid crystal mixture in a 25 μm cell gap in twisted nematic configuration. The mixture used is the same as the one used in published patent application WO 2014/135240, named mixture "H2", in combination with 0.11 weight % of dye D1, 0.15 weight % of dye D2 and 0.23 weight % of dye D3, where the dyes D1, D2 and D3 are mentioned under these names in the above patent application as well.

Figure 3:
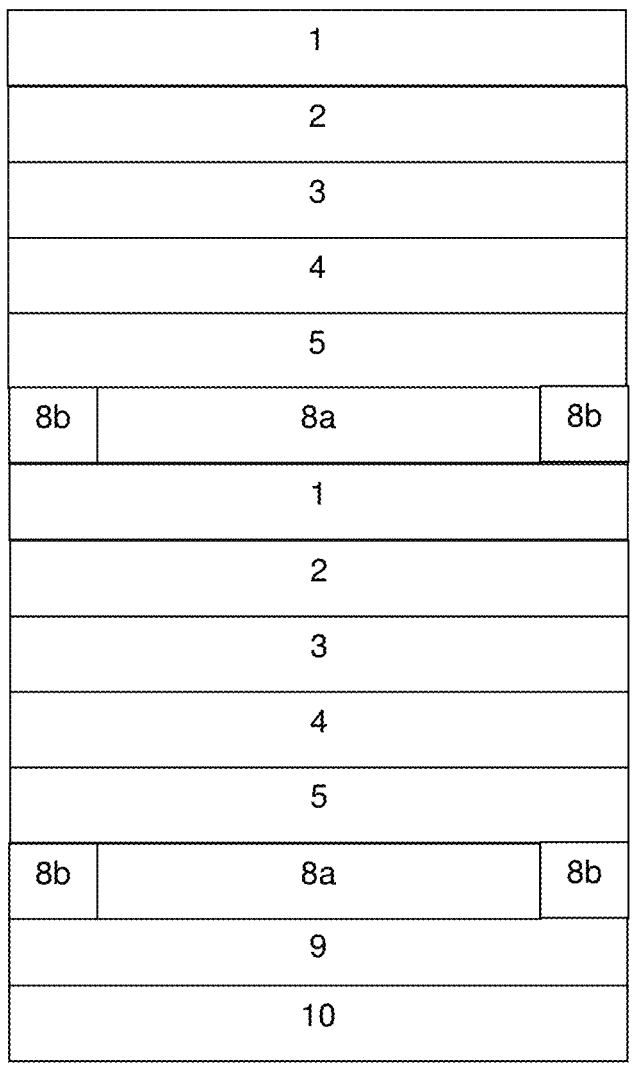
FIG. 3 shows a side view of the stack of layers of a switchable device according to the present application, being part of an IGU, where two switchable devices according to the present application are stacked on top of each other to form a double liquid crystal (LC) cell device.

Both thus obtained LC cells are then combined to a double cell structure as schematically shown in FIG. 3, to obtain a switchable window with dye doped double LC cell layout. A capacitive touch foil (commercially obtained from Pro Display, Hoyland, U.K.) is attached to the outer side of the outer glass sheet, as schematically shown in FIG. 3.

Electrical wiring is applied to all conductive sections of the sheets in the accessible positions.

Figure 7:
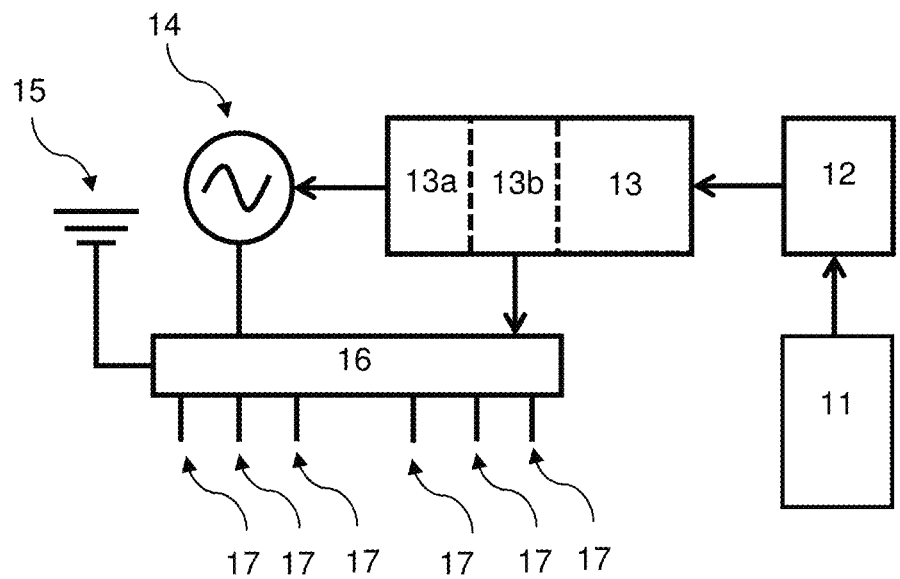
FIG. 7 shows an assembly of electrical components connected to the switchable device.
Figure 7A:
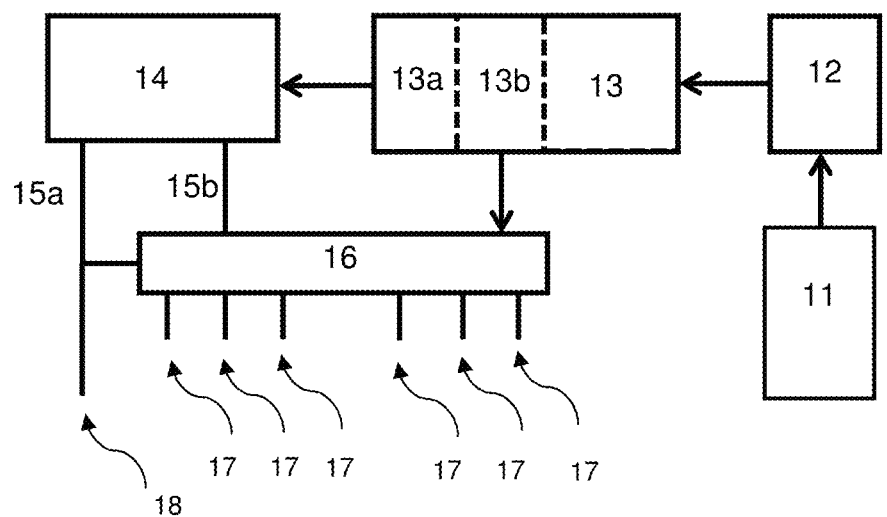
FIG. 7a shows an alternative assembly of electrical components connected to the switchable device.

2) Contacting of the Window to the Touch Sensitive Foil to Arrive at a Touch Controllable Window In accordance with the scheme shown in FIG. 7, each of the conductive sections of the two LC cells is connected to a separate switch, which is capable of switching the respective section between GND and a power supply (0-24 V AC). The switches are controlled using digital outputs (DO) of a programmable logic controller (PLC). The voltage of the power supply is also set by the PLC, controlled by an analog output of the PLC. The touch foil is connected to a PC which runs the corresponding drivers and contains software which defines specific touch areas and the effect of gestures on the touch sensitive foil. The PC is connected to the PLC to determine the desired window state after a touch event.

The touch areas and touch gestures defined in the software allow to control the greyscale of the device using a horizontal drag motion, to switch individual segments with a touch, to switch all segments simultaneously with a double touch and to switch consecutive segments by a vertical drag motion, thereby mimicking blinds.

Figure 8:
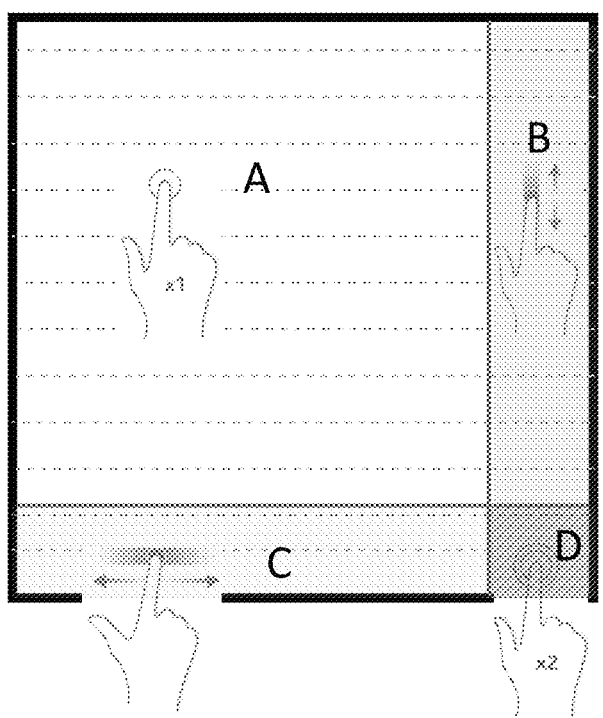
FIG. 8 shows schematically position and form of touch gestures performed on the surface of the switchable device.
Figure 9:
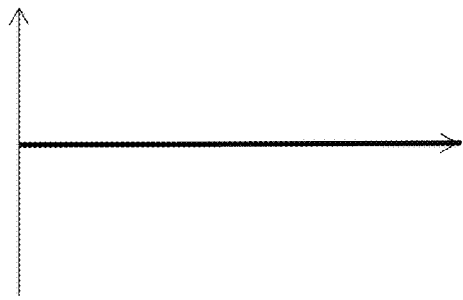
FIG. 9 shows the signal applied to the segmented substrate, according to a first mode of operation of the device.
Figure 9:
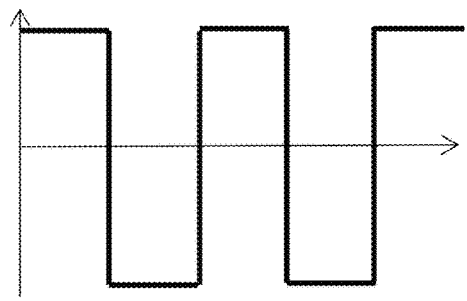
Figure 9:
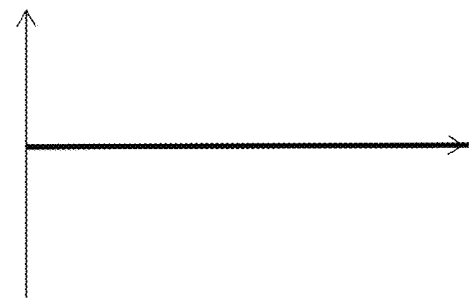
Figure 10:
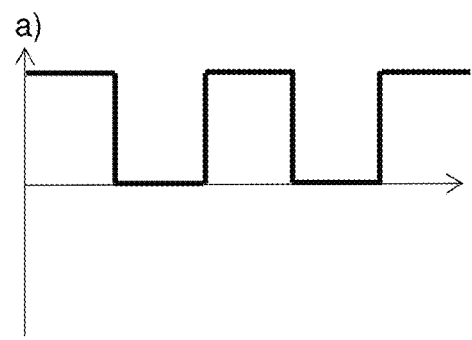
FIG. 10 shows the signal applied to the non-segmented substrate, and the signal applied to the segmented substrate, according to a second mode of operation of the device.
Figure 10:
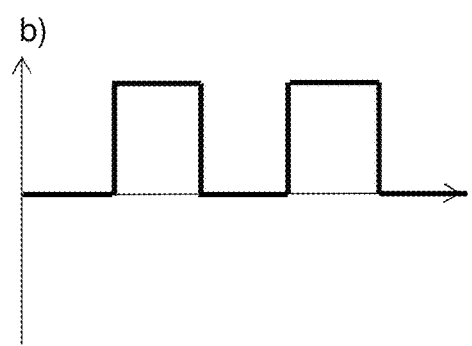
Figure 10:
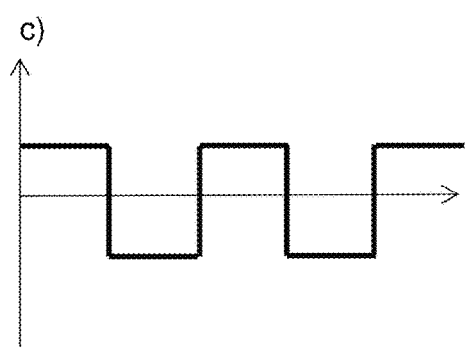

FIG. 8 shows the effect of touch gestures to the liquid crystal window: a single tap switches the segment in the corresponding area between its on and off states (A). On the side of the window there is a region (B) where a vertical drag down motion results in switching the segments consecutively to dark (starting from the top segment and continuing until the drag motion stops) or a drag up motion results in switching the segments consecutively to bright (starting from the bottom and continuing until the drag motion stops), resulting in a partly switched window. On the bottom there is a region (C) where a drag to the left results in dimming of segments that are switched on and a drag to the right increases the brightness of segments that switched on. A double tap in the region on the bottom right (D) switches all segments between the dark and the bright state. The dashed lines in FIG. 8 indicate the positioning of the segments (isolated sections of the conductive layer created by laser ablation).

The invention claimed is:

1. A switchable device for the regulation of light transmission, comprising
    a stack of layers which comprises a first substrate layer, a second substrate layer, a switching layer which is positioned between the first and the second substrate layers, a first conductive layer which is positioned between the switching layer and the first substrate layer, and a second conductive layer which is positioned between the switching layer and the second substrate layer, and
    which device comprises an interconnected assembly, comprising a touch sensitive layer, an assembly comprising one or more logic units, which translates the output signals of the touch sensitive layer into output signals, one or more voltage sources whose output voltage can be varied depending on an input signal, and a plurality of switches which are capable of switching each one of the plurality of conductive segments on and off, depending on an input signal,
    wherein each of the switches of the plurality of switches is connected to a separate power source with independently adjustable voltage
    where the switching layer comprises a material which changes its light transmissivity upon the application of voltage,
    wherein the switching layer is a liquid crystal switching layer,
    wherein the liquid crystal switching layer comprises one or more dichroic dyes dissolved in the liquid crystalline material,
    where at least one of the first and the second conductive layers comprises a plurality of isolating sections and a plurality of conductive sections, where the isolating sections and the conductive sections alternate over the area of the conductive layer, and where the switching state of the switchable device is controlled by a touch motion,
    where a part of one of the first and the second conductive layers does not overlap in the stack with the other of the first and the second conductive layers, which part is electrically connected to voltage, and
    wherein the stack of layers comprises a UV blocking layer which blocks transmission of light with wavelengths in the range of 350 nm to 390 nm.

2. The switchable device according to claim 1, wherein the isolating sections and the conductive sections alternate in a regular pattern over the area of the conductive layer.

3. The switchable device according to claim 1, wherein for each one of the plurality of conductive sections, the switching state of the specific section of the switching layer which is covered by the area of the conductive section is capable of being selected independently of the switching state of the other sections of the switching layer.

4. The switchable device according to claim 3, wherein the switching state of each of the specific sections of the switching layer which is capable of being selected independently is controlled by a touch motion on a touch sensitive layer.

5. The switchable device according to claim 1, wherein the isolating sections are lines with a width of 0.2 µm to 100 µm.

6. The switchable device according to claim 1, wherein the isolating sections are lines which are parallel to each other and which are regularly spaced, with a distance between the parallel lines of in each case between 1 µm and 1 m, where the conductive sections are positioned in the space between the lines.

7. The switchable device according to claim 1, wherein the first and the second conductive layer comprise a thin layer of metal or of other material.

8. The switchable device according to claim 1, wherein the isolating sections of the conducting layer have been created by laser ablation, chemical etching, laser photolithography, mechanical embossing, photo embossing, sputtering an ITO or similar conductive material coating as a conductive layer while certain sections have been covered, which has been followed by later removal of the covering material to obtain a glass section without the coating; or coating conductive material only in specific sections by inkjet printing of solution processable conductors.

9. The switchable device according to claim 1, wherein only one of the first and the second conductive layers comprises a plurality of isolating sections, and the other one of the first and the second conductive layers comprises no or essentially no isolating sections.

10. The switchable device according to claim 1, wherein a part of one of the first and the second conductive layers does not overlap in the stack with the other of the first and the second conductive layers in a freely accessible from at least one side, which part is electrically connected to voltage.

11. The switchable device according to claim 1, wherein the part of one of the first and the second conductive layers which does not overlap in the stack with the other of the first and the second conductive layers has overlapping areas with each of the conductive sections of the conductive layer, where optionally, in these overlapping areas, the conductive sections are each separately electrically connected to voltage.

12. The switchable device according to claim 1, wherein the conductive sections of one of the first and the second conductive layers are each separately and independently electrically contacted with a power source by direct addressing, passive matrix addressing, active matrix addressing or multiplex driving.

13. The switchable device according to claim 1, wherein a touch sensitive layer is present inside or on the stack of layers of the switchable device, or in an external touch sensitive device which is connected to the switchable device by electrical wiring or by wireless connection.

14. The switchable device according to claim 1, wherein the liquid crystal switching layer is selected from the group consisting of polymer comprising liquid crystal switching layers and small molecule based liquid crystal switching layers.

15. The switchable device according to claim 1, wherein the liquid crystal switching layer is a polymer comprising a liquid crystal switching layer, which is a polymer dispersed liquid crystal switching layer.

16. The switchable device according to claim 1, wherein the liquid crystalline material comprises one or more liquid crystalline organic compounds, which are selected from the group consisting of small molecules and polymeric materials.

17. The switchable device according to claim 1, wherein the switching layer is switched by application of an electric field between at least two different switching states, where one of the states is a dark state or a scattering state, and the other state is a clear state.

18. The switchable device according to claim 17, wherein in the dark state, the liquid crystalline material is in a state selected from the group consisting of nematic non-twisted, nematic twisted and nematic supertwisted, and wherein in the clear state, the material is in a homeotropic state.

19. A switchable device stack, comprising a first switchable device and a second switchable device, wherein both the first and second devices are according to claim 1.

20. A window, comprising a switchable device according to claim 1, and optionally comprising an insulated glass unit, where the switchable device is positioned inside of the insulated glass unit.

21. The window according to claim 20, further comprising a separate touch sensitive device, which is optionally positioned on a frame of the window.

22. A building or a vehicle, comprising the switchable device according to claim 1, or comprising a window that comprises said switchable device.

* * * * *